Figure 1:
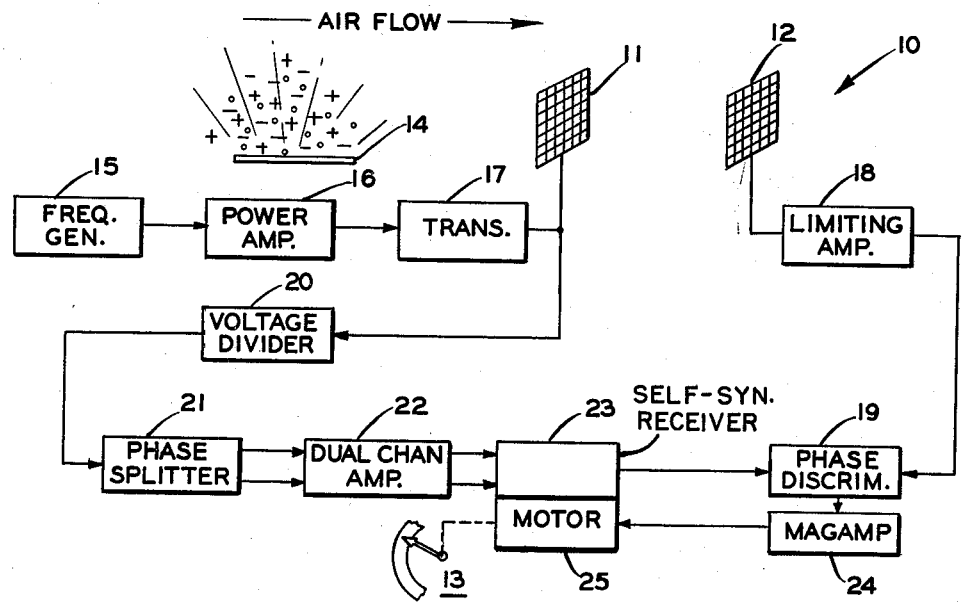

March 24, 1953  A. A. STUART  2,632,326

TRUE AIR SPEED INDICATOR OF THE IONIZATION TYPE

Filed Aug. 31, 1948

*INVENTOR.*
ALFRED A. STUART
BY
- *ATTORNEY* -

Patented Mar. 24, 1953

2,632,326

UNITED STATES PATENT OFFICE 2,632,326

TRUE AIR SPEED INDICATOR OF THE IONIZATION TYPE

Alfred A. Stuart, Ridgewood, N. J., assignor to Bendix Aviation Corporation, Teterboro, N. J., a corporation of Delaware Application August 31, 1948, Serial No. 47,053

10 Claims. (Cl. 73—181)

This invention relates to an airspeed indicator, and more particularly to a true airspeed indicator of the ionization type for measuring the velocity of aircraft in the subsonic, sonic and supersonic ranges of airspeed.

This application relates to subject matter similar to that disclosed in my copending application for Ionizing True Airspeed Indicator filed on June 16, 1948, and bearing Serial No. 33,390.

In my parent application I provided a true airspeed indicator for indicating the velocity of aircraft by measuring the time interval a group of ions generated at one point required to be carried downstream by the airstream to a second known point. The group of ions were produced at the upstream point by means of an arc or by means of an electrode connected to a varying source of high potential. By interconnecting the source of ionization and the collector, which in one instance was a second spark gap and in the other was a pickup electrode, by suitable electronic circuits the phase differences of the two voltages, the one producing the ions and the other resulting from the ions, were compared to provide a measure of the velocity of the craft.

In my copending application a source of high voltage was required to provide ionization of the airstream. Due to the increasing corona discharge at increasing altitudes, and such corona discharge producing severe radio interference, means were incorporated in my previous application for decreasing the high voltage source as the altitude increased to a value at which ionization took place without producing corona discharge. Maintaining the voltage source at a pre-corona level was accomplished by the use of an altitude sensitive element and a rotary transformer wherein the secondary winding was rotated with respect to the primary winding to change the coupling thereof so as to reduce the potential applied to the ionization electrode.

My present invention has for an object, provisions for eliminating the high potential source required in my previous application for producing the ions required in operating the airspeed indicator.

Another object of my present invention is to provide an ionizing true airspeed indicator in which a radioactive material is used as a source of ions.

A further object of the present invention is to provide a true airspeed indicator of the character described in which two screens, grids or collectors, spaced apart a known distance in the slipstream of a craft will collect the ions produced by the radioactive material, thereby providing voltages of different phases responsive to the time interval required for the ions to travel from one electrode to the other, for indicating the true airspeed of the craft.

Still another object of my invention is to provide an ionizing true airspeed indicator of the character described which shall consist of few and simple parts and circuit elements, which shall be relatively inexpensive to manufacture, which shall be light in weight and small in size, which shall be automatic and positive in its operation, have a large variety of applications in measuring the velocity of fluids in motion, and yet be practical and efficient to a high degree in use.

Other objects of my present invention will in part be obvious and in part hereinafter pointed out.

In carrying out one embodiment of my present invention I provide a source of radioactive material at an upstream point, the alpha particles from the source ionizing the air of the slipstream. At a point downstream from the radioactive material I place a first screen or electrode which is charged from a source of potential which is varied in a periodic manner, and which may be undulating direct current but is preferably alternating current of approximately 250 volts. At a known distance downstream from the first screen I place a second in line with the first screen and the radioactive material.

Due to the source of radioactive material, the bombardment of the air by the alpha particles will create approximately equal amounts of positive and negative particles, the positive particles being atoms lacking one or more electrons, the negative particles being mostly free electrons. These charges travel along with the neutral molecules of air until they reach the first screen or electrode. Depending upon the polarity of the screen voltage at any given instant, either the positive or negative charges will be attracted thereto; i. e., if we assume the screen voltage to be of positive polarity, the free electrons will be attracted thereto. Thus the ionized airstream may be considered as consisting of a group of positive charges with a few negative charges, followed by a group of negative charges (the screen polarity swinging positive) including a few positive charges, etc. The polarized ionized airstream passing through and in proximity to the second screen or electrode will induce therein a periodically varying voltage.

Knowing the distance between the two screens, a circuit interconnecting the two screens whereby the phase of the energizing voltage applied to the first electrode may be compared with the phase of the voltage induced in the second electrode will provide a measure of the true airspeed of the craft.

In the detailed description hereinafter made, a second embodiment of my invention is described in which the induced voltage of the second screen provides a feedback voltage of an oscillator circuit, the frequency of the oscillation being a measure of the airspeed of the craft.

Figure 2:
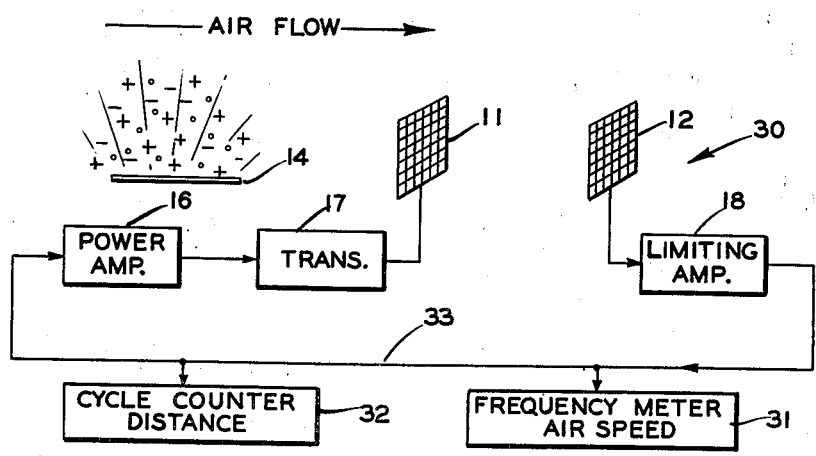

In the drawings forming a part of this specification wherein similar reference numerals are used to designate corresponding parts through the two views, Figure 1 is a block diagram of one of the various possible illustrative embodiments of my invention, hereinafter referred to as the phase shift method; while Figure 2 is a block diagram of a second embodiment of my present invention hereinafter referred to as the frequency method.

Referring now in detail to Figure 1, the numeral 10 designates a circuit interconnecting a screen or electrode 11 and a second screen or electrode 12 placed in the slipstream of a plane downstream from said first electrode, with a meter 13 for indicating the true airspeed of a craft. Placed in the slipstream of the craft upstream from the screen 11 is a radioactive element 14 for ionizing the air as it flows thereover in the direction indicated by the arrow.

The screen 11 is connected to a source of variable voltage herein indicated as a frequency generator 15, a power amplifier 16 and a transformer 17. The second screen 12 is connected through a limiting amplifier 18, the output of which is applied to a phase discriminator circuit 19.

A portion of the voltage applied to the first electrode 11 is impressed through a voltage divider 20 on a phase splitting circuit 21. The output of the phase splitter 21 is applied to a dual channel amplifier 22, the output of said amplifier being applied to a self-synchronous receiver 23. The output of receiver 23 is applied to the phase discriminating circuit 19, the output of said phase discriminator being applied to a magnetic amplifier 24. The magnetic amplifier is connected to a servo motor 25 which is coupled to the indicator 13 and to the rotor (not shown) of the receiver 23.

For a detailed description and circuit diagram of the circuit elements herein described, reference may be had to the parent application.

The radioactive material 14 will produce positive and negative charges in the slipstream of the craft. The ionized air will be carried downstream to pass through and/or adjacent the screen 11. Dependent upon the polarity of the screen 11, either positive or negative charges of the air will be attracted to the screen. The remaining charged particles of the air will be carried downstream to the second electrode 12. Since the variable voltage applied to the first screen 11 will first alternately reduce the negative charges and then positive charges in the ionized airstream, the ionized air passing adjacent or through the screen 12 will induce in said screen a voltage which is also of an undulating character. The phase of the induced voltage of screen 12 will depend upon the polarity of the charged particles passing the second screen. Since the voltage applied to the first screen is of an undulating or variable character, the phase or polarity of the voltage producing the attraction for either the positive or negative charged particles is known. To obtain then true airspeed, the phase of the energizing voltage and the phase of the induced voltage are compared.

The phases of the two voltages are compared by applying a portion of the energizing voltage applied to the screen 11 through a voltage divider to the phase splitter 21. Here, as in the parent application, the phase of the energizing voltage is split in two, ninety degrees apart. The two voltages are then amplified by the dual channel amplifier 22, the output of which is connected to the two ninety degree phase windings (not shown) of receiver 23. The voltages applied across the phase windings will induce a signal in the rotor (not shown) of the receiver which is then applied to the phase discriminating circuit 19.

Now the voltage induced in the screen 12 is amplified to a limited degree by the limiting amplifier 18 and impressed on the phase discriminating circuit 19. The discriminating circuit 19 is of the bridge type more adequately described in the parent application, the unbalance of which will provide a voltage across the saturating winding (not shown) of the magnetic amplifier 24. The servo motor 25 will thus be operated in one direction or the other depending upon the phase difference of the two voltages to position the indicator 13 for showing the airspeed, and to position the rotor (not shown) of the receiver 23 so that the phase of the energizing voltage is equal to the phase of the induced voltage. When a stable condition is attained, no voltage output will be provided by the phase discriminator circuit 19; the rotor 25 being brought to a standstill.

Referring now in detail to Figure 2 in which there is illustrated the frequency method of measuring the true airspeed of a craft, the numeral 30 designates a circuit interconnecting the first screen 11 and the second screen 12 with a frequency meter 31 and a cycle counter 32. The screen 11 is placed in the slipstream of the craft downstream from the source of radioactive material 14, while the screen 12 is placed in line with the radioactive material 14 and the screen 11. The screen 11 is connected to the power amplifier 16 through a transformer 17. The second screen 12 is connected through the limiting amplifier 18, the output of which is fed as by a lead 33 to the input of the power amplifier 16 forming a feedback circuit thereof to sustain the oscillations of the oscillator thus formed.

The positive and negative charges of the ionized air due to the alpha bombardment of the radioactive material pass through the screen 11 and then through the screen 12 in the manner heretofore described. Due to the varying voltage applied to the screen 11 charged particles of opposite polarity are attracted to the screen 11 so that the ionized airstream, when it reaches the screen 12 comprises groups of charged particles which for the most part are of one polarity or another. The polarized airstream will thus induce in the screen 12 a voltage whose phase is dependent upon the polarity of the charged particles. This induced voltage is amplified to a limited extent by the amplifier 18 and applied to the input side of the power amplifier 16 for sustaining the oscillations of the oscillator circuit. The frequency of oscillations of the oscillator circuit will depend upon the time interval required of each group of ions to travel the known distance between the screens 11 and 12. By connecting a frequency meter into the feedback line 33, the airspeed of the craft will be indicated. A cycle counter connected into the feedback line will indicate the air distance travelled by the craft.

The device may be used to determine the quantity of fluid passing a given point where the cross-sectional area of the fluid passing the point is known, such as by confining the fluid in a pipe or container, and multiplying the distance measurement of the cycle counter by the cross-sectional area of the fluid.

It will thus be seen that there is provided a novel true airspeed indicator in which the several objects of this invention are achieved and which is well adapted to meet the conditions of practical use.

As various possible embodiments of the above invention may be made, and as various changes may be made in the embodiments above set forth, it will be understood that all matter herein contained or shown in the accompanying drawings, is to be interpreted as illustrative and not in a limiting sense.

Having thus described my invention, I claim as new and desire to secure by Letters Patent:

1. A fluid velocity meter comprising a source of ions in the flowing fluid, means at a downstream point from said source attracting thereto alternately the positive and negative charges of the ionized fluid, means downstream a known distance from said first means producing electrical impulses in response to the polarized ionized stream flowing thereby, and means connected to said first and second means and responsive to the electrical impulses and indicating the velocity of the flowing fluid.

2. A fluid velocity meter comprising means for ionizing the flowing fluid, a screen downstream from said means charged by a periodically varying voltage, a second screen a known distance downstream from said first screen having a periodically varying voltage induced thereon by the ionized stream, and means associated with said screens and responsive to the charging voltage and the induced voltage and indicating the velocity of the flowing fluid.

3. A fluid velocity meter comprising a source of radioactive material for ionizing the flowing fluid, means at a point downstream from said source for attracting thereto alternately the positive and negative charges of the ionized fluid, means downstream from said first means for producing electrical impulses in response to the polarized ionized stream flowing thereby, and means connected to said first and second means and responsive to the electrical impulses and indicating the fluid velocity.

4. A fluid velocity meter comprising a source of radioactive material for ionizing the flowing fluid, a screen downstream from said radioactive material charged by a periodically varying voltage, a second screen a known distance downstream from said first screen having a periodically varying voltage induced thereon by the polarized ionized fluid, and means connected to said screens and responsive to the charging voltage of said screens and indicating the velocity of the fluid.

5. A fluid velocity meter comprising a source of radioactive material for ionizing the flowing fluid, a screen downstream from said radioactive material charged by a periodically varying voltage, a second screen a known distance downstream from said first screen having a periodically varying voltage induced thereon by the polarized ionized fluid, and a phase discriminator circuit connected to said screen and comparing the phases of the charging voltage and the induced voltages of said screens.

6. A fluid velocity meter comprising a source of radioactive material for ionizing the flowing fluid, a screen downstream from said radioactive material charged by a periodically varying voltage, a second screen a known distance downstream from said first screen having a periodically varying voltage induced thereon by the polarized ionized fluid, and an amplifier interconnecting said first and second screens, the induced voltages of said second screen being applied to said amplifier to sustain said periodically varying voltage charging the first screen.

7. A fluid velocity meter comprising a source of radioactive material for ionizing the flowing fluid, a screen downstream from said radioactive material charged by a periodically varying voltage, a second screen a known distance downstream from said first screen having a periodically varying voltage induced thereon by the polarized ionized fluid, a circuit including an amplifier interconnecting said first and second screens, the induced voltages of said second screen being applied to said amplifier to sustain the periodically varying voltage charging the first screen, and a frequency meter in said circuit to indicate the velocity of the fluid.

8. A true airspeed indicator comprising a source of radioactive material for ionizing the airstream, a screen downstream from said material charged by a periodically varying voltage, a second screen a known distance downstream from said first screen having a periodically varying voltage induced therein by the polarized ionized airstream, and a circuit interconnecting said screens and including means responsive to the periodically varying voltage induced in said second screen to indicate airspeed.

9. A true airspeed indicator comprising a source of radioactive material for ionizing the airstream, a screen downstream from said material charged by a periodically varying voltage, a second screen a known distance downstream from said first screen having a periodically varying voltage induced therein by the polarized ionized airstream, and a circuit interconnecting said screens and including means responsive to the periodically varying voltage induced in said second screen to indicate airspeed and means to indicate the air distance traveled.

10. In a meter for measuring fluid flow of a known cross-sectional area, a source of radioactive material for ionizing the fluid, a screen downstream from said radioactive material charged by a periodically varying voltage, a second screen a known distance downstream from said first screen having a periodically varying voltage induced thereon by the polarized ionized fluid, a circuit including an amplifier interconnecting said first and second screens, the induced voltages of said second screen being applied to said amplifier to sustain the periodically varying voltage charging the first screen, a frequency meter in said circuit, and a cycle counter in said circuit to indicate the quantity of the fluid.

ALFRED A. STUART.

REFERENCES CITED

The following references are of record in the file of this patent:

UNITED STATES PATENTS

| Number | Name | Date |
|---|---|---|
| 1,808,709 | Blake | June 2, 1931 |

FOREIGN PATENTS

| Number | Country | Date |
|---|---|---|
| 483,166 | Germany | Sept. 27, 1929 |